US012255797B2

United States Patent
Sundararajan et al.

(10) Patent No.: US 12,255,797 B2
(45) Date of Patent: Mar. 18, 2025

(54) SOFTWARE-AS-A-SERVICE PROBE AGGREGATION IN NETWORKS

(71) Applicant: Cisco Technology, Inc., San Jose, CA (US)

(72) Inventors: Balaji Sundararajan, Fremont, CA (US); Vivek Agarwal, Campbell, CA (US); Jegan Kumar Somi Ramasamy Subramanian, Mountain View, CA (US); Gokul Krishnan, Milpitas, CA (US); Giorgio Valentini, Walnut Creek, CA (US); Venkatraman Venkatapathy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 17/867,389

(22) Filed: Jul. 18, 2022

(65) Prior Publication Data

US 2023/0412483 A1 Dec. 21, 2023

Related U.S. Application Data

(60) Provisional application No. 63/353,356, filed on Jun. 17, 2022.

(51) Int. Cl.
*G06F 15/16* (2006.01)
*H04L 41/0654* (2022.01)
(Continued)

(52) U.S. Cl.
CPC .......... *H04L 43/12* (2013.01); *H04L 41/0654* (2013.01); *H04L 43/08* (2013.01)

(58) Field of Classification Search
CPC ...... H04L 43/12; H04L 41/0654; H04L 43/08
See application file for complete search history.

(56) References Cited

U.S. PATENT DOCUMENTS

| 10,038,601 | B1 * | 7/2018 | Becker | .................. H04L 43/12 |
| 10,198,724 | B2 * | 2/2019 | Carney | .................. G06Q 20/10 |

(Continued)

FOREIGN PATENT DOCUMENTS

| CA | 2978760 A1 * | 3/2018 | ............. H04L 41/12 |
| CN | 108737155 A * | 11/2018 | ......... H04L 41/0631 |

(Continued)

OTHER PUBLICATIONS

Search Report and Written Opinion mailed Oct. 9, 2023 for PCT Application No. PCT/US2023/025535, 13 pages.

*Primary Examiner* — Moustafa M Meky
*Assistant Examiner* — Thorne E Waugh
(74) *Attorney, Agent, or Firm* — Lee & Hayes, P.C.

(57) ABSTRACT

Techniques for sharing the probing of software-as-a-service clouds among a cluster of routers are described herein. The techniques may include establishing a first path between a cluster of routers and an application infrastructure. Establishing a second path between the cluster of routers and the application infrastructure. Designating a first router in the cluster of routers to send probes over the first path to the application infrastructure. Designating a second router in the cluster of routers to send probes over the second path to the application infrastructure. Distributing, by the first router and to the cluster of routers, first routing performance data indicating a performance of the first path when communicating with the application infrastructure over the first path, distributing, by the second router and to the cluster of routers, second routing performance data indicating a performance of the second path when communicating with the application infrastructure over the second path.

20 Claims, 7 Drawing Sheets

(51) Int. Cl.
*H04L 43/08* (2022.01)
*H04L 43/12* (2022.01)

(56) References Cited

U.S. PATENT DOCUMENTS

| | | | |
|---|---|---|---|
| 10,972,370 B1 | 4/2021 | Peschka | |
| 11,032,188 B2* | 6/2021 | Modi | H04L 67/563 |
| 11,379,256 B1* | 7/2022 | Agarwal | G06F 21/53 |
| 11,477,112 B2* | 10/2022 | Vasseur | H04L 41/147 |
| 11,528,218 B2* | 12/2022 | Kolar | H04L 43/0882 |
| 11,582,144 B2* | 2/2023 | Ramaswamy | H04L 43/16 |
| 11,700,196 B2* | 7/2023 | Michael | H04L 45/64 370/252 |
| 11,706,127 B2* | 7/2023 | Michael | H04L 43/0876 370/252 |
| 2012/0218936 A1* | 8/2012 | Fleeman | H04L 45/04 370/316 |
| 2013/0339544 A1* | 12/2013 | Mithyantha | H04L 45/02 709/238 |
| 2015/0319707 A1* | 11/2015 | Abdelmonem | H04W 24/08 455/522 |
| 2016/0294664 A1* | 10/2016 | Manghirmalani | H04L 43/12 |
| 2017/0149615 A1* | 5/2017 | He | G06F 9/00 |
| 2018/0375729 A1* | 12/2018 | Tzoreff | H04W 76/19 |
| 2019/0104035 A1* | 4/2019 | Cidon | H04M 15/51 |
| 2019/0104413 A1* | 4/2019 | Cidon | H04L 12/4625 |
| 2020/0036624 A1* | 1/2020 | Michael | H04L 45/123 |
| 2020/0267114 A1* | 8/2020 | Ramamurthy | H04L 47/125 |
| 2020/0382402 A1* | 12/2020 | Kolar | H04L 43/20 |
| 2021/0067468 A1* | 3/2021 | Cidon | H04L 49/354 |
| 2021/0160179 A1* | 5/2021 | Sundararajan | H04L 47/2441 |
| 2021/0211347 A1* | 7/2021 | Vasseur | H04L 43/16 |
| 2021/0218658 A1* | 7/2021 | Vasseur | H04L 47/10 |
| 2021/0297429 A1* | 9/2021 | Sundararajan | H04L 43/08 |
| 2021/0352138 A1* | 11/2021 | Kodavanty | H04L 67/562 |
| 2021/0399920 A1* | 12/2021 | Sundararajan | H04L 41/12 |
| 2022/0052905 A1* | 2/2022 | Vasseur | H04L 41/14 |
| 2022/0052927 A1* | 2/2022 | Yelahanka Raghuprasad | H04L 41/5025 |
| 2022/0060393 A1* | 2/2022 | Vasseur | H04L 41/5025 |
| 2022/0141131 A1* | 5/2022 | Rajamanickam | H04L 45/123 370/252 |
| 2022/0329477 A1* | 10/2022 | Chiganmi | H04L 41/0654 |
| 2022/0360567 A1* | 11/2022 | Vasseur | H04L 63/166 |
| 2022/0376998 A1* | 11/2022 | Vasseur | H04L 69/326 |
| 2022/0385569 A1* | 12/2022 | Kolar | H04L 45/08 |
| 2023/0019274 A1* | 1/2023 | Garcarz | H04L 43/10 |
| 2023/0035691 A1* | 2/2023 | Savalle | H04L 45/22 |
| 2023/0116881 A1* | 4/2023 | Mehta | H04L 45/123 709/238 |
| 2023/0179445 A1* | 6/2023 | Cidon | H04L 45/123 370/254 |

FOREIGN PATENT DOCUMENTS

| | | | | |
|---|---|---|---|---|
| EP | 3697039 A1 * | 8/2020 | | H04L 41/5019 |
| WO | WO-0052906 A1 * | 9/2000 | | H04L 29/06 |

* cited by examiner

| Application Infrastructure | Path | QoE Score (0 – 10) 212 |
|---|---|---|
| SaaS 206(A) | ISP 1 208(A) | 6 |
| SaaS 206(B) | IPS 1 208(A) | 8 |
| SaaS 206(C) | ISP 1 208(A) | 10 |
| SaaS 206(C) | ISP 2 208(B) | 8 |
| SaaS 206(D) | MPLS 208(C) | 9 |
| SaaS 206(E) | MPLS 208(C) | 9 |
| SaaS 206(E) | 4G LTE 208(D) | 7 |
| SaaS 206(F) | 4G LTE 208(D) | 5 |

```
┌─────────────────────────────────────────────────────────────┐
│  ESTABLISH A FIRST PATH BETWEEN A CLUSTER OF ROUTERS AND AN │
│                   APPLICATION INFRASTRUCTURE                │
│                             302                             │
└─────────────────────────────────────────────────────────────┘
                              │
                              ▼
┌─────────────────────────────────────────────────────────────┐
│ ESTABLISH A SECOND PATH BETWEEN THE CLUSTER OF ROUTERS AND  │
│                THE APPLICATION INFRASTRUCTURE               │
│                             304                             │
└─────────────────────────────────────────────────────────────┘
                              │
                              ▼
┌─────────────────────────────────────────────────────────────┐
│ DESIGNATE A FIRST ROUTER IN THE CLUSTER OF ROUTERS TO SEND  │
│      PROBES OVER THE FIRST PATH TO THE APPLICATION          │
│                      INFRASTRUCTURE                         │
│                             306                             │
└─────────────────────────────────────────────────────────────┘
                              │
                              ▼
┌─────────────────────────────────────────────────────────────┐
│ DESIGNATE A SECOND ROUTER IN THE CLUSTER OF ROUTERS TO SEND │
│     PROBES OVER THE SECOND PATH TO THE APPLICATION          │
│                      INFRASTRUCTURE                         │
│                             308                             │
└─────────────────────────────────────────────────────────────┘
                              │
                              ▼
┌─────────────────────────────────────────────────────────────┐
│ DISTRIBUTE, BY THE FIRST ROUTER AND TO THE CLUSTER OF       │
│ ROUTERS, FIRST ROUTING PERFORMANCE DATA INDICATING A        │
│ PERFORMANCE OF THE FIRST PATH WHEN COMMUNICATING WITH THE   │
│ APPLICATION INFRASTRUCTURE OVER THE FIRST PATH              │
│                             310                             │
└─────────────────────────────────────────────────────────────┘
                              │
                              ▼
┌─────────────────────────────────────────────────────────────┐
│ DISTRIBUTE, BY THE SECOND ROUTER AND TO THE CLUSTER OF      │
│ ROUTERS, SECOND ROUTING PERFORMANCE DATA INDICATING A       │
│ PERFORMANCE OF THE SECOND PATH WHEN COMMUNICATING WITH THE  │
│ APPLICATION INFRASTRUCTURE OVER THE SECOND PATH             │
│                             312                             │
└─────────────────────────────────────────────────────────────┘
```

SOFTWARE-AS-A-SERVICE PROBE AGGREGATION IN NETWORKS

RELATED APPLICATIONS

This application claims priority to U.S. Provisional Patent Application No. 63/353,356, filed on Jun. 17, 2022, the entire contents of which are incorporated herein by reference and for all purposes.

TECHNICAL FIELD

The present disclosure relates generally to techniques for probing software-as-a-service clouds efficiently by distributing probing responsibilities in a colocation facility to multiple routers and sharing the context of probe results among the routers.

BACKGROUND

Cloud computing allows on demand network-based access to application infrastructures to remote user without direct active management by the users. Software-as-a-Service (SaaS) providers build their network interfaces towards bringing content and applications closer to the end enterprise user. Currently, for SaaS implementations, application probes, for determining routing performance data, are enabled at a per device per interface level where all possible paths are continuously monitored by sending probes and then, based on probe latency and loss, selecting the best possible path for routing communication traffic. If there are multiple network devices (e.g., routers) in one site and all of them are using the same internet service provider (ISP) the probes are enabled for the same set of applications on each network device. If the ISP is the same, the probe results are going to be the same for each application, resulting in redundant probes and unnecessary high volumes of network traffic.

With cellular network providers, the same subnet IP may be distributed across TLOCs/WAN interfaces of the SD-WAN interfaces and with this the WAN transports towards the SaaS will be the same at that datacenter. In such cases, customers often configure large amounts of applications. Consequently, the probe results are identical for a given application across all the routers. On a scaled solution (multiple hub routers with a single ISP in a site), the redundant probes for the same application from each device producing identical results is unnecessary. In some instances, 10 probes are generated (spaced 1 second apart) every 30 seconds per application per link. In a datacenter site with 10 devices with 100 applications, this will lead to generating about 1000 probes every 30 seconds for each device. This leads to scale problems when accessing web scale applications in SaaS clouds.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various technologies associated with probing SaaS clouds efficiently by distributing probing responsibilities in a colocation site among a cluster of routers and sharing the context of probe results with the other routers in the cluster. By way of example, and not limitation, a method according to the various technologies presented herein may include establishing a first path between a cluster of routers and an application infrastructure. Additionally, the method may include establishing a second path between the cluster of routers and the application infrastructure. The method may also include designating a first router in the cluster of routers to send probes over the first path to the application infrastructure. Additionally, the method may include designating a second router in the cluster of routers to send probes over the second path to the application infrastructure. The method may also include distributing, by the first router and to the cluster of routers, first routing performance data indicating a performance of the first path when communicating with the application infrastructure over the first path. Finally, the method may include distributing, by the second router and to the cluster of routers, second routing performance data indicating a performance of the second path when communicating with the application infrastructure over the second path.

In another example, a method according to various technologies presented herein may include establishing a first path between a cluster of routers and a first application infrastructure. Additionally, the method may include establishing a second path between the cluster of routers and a second application infrastructure, the second path using a same network service provider as the first path. The method may also include establishing a third path between the cluster of routers and the first application infrastructure. Also, the method may include establishing a fourth path between the cluster of routers and the second application infrastructure, the fourth path using a same network service provider as the third path. Additionally, the method may include designating a first router in the cluster of routers to send probes over the first path to the first application infrastructure. The method may also include designating a second router in the cluster of routers to send probes over the second path to the second application infrastructure. In addition, the method may include designating a third router in the cluster of routers to send probes over the third path to the first application infrastructure. The method may also include designating a fourth router in the cluster of routers to send probes over the fourth path to the second application infrastructure. Additionally, the method may include distributing, by the first router and to the cluster of routers, first routing performance data indicating a performance of the first path when communicating with the first application infrastructure over the first path. Also, the method may include distributing, by the second router and to the cluster of routers, second routing performance data indicating a performance of the second path when communicating with the second application infrastructure over the second path. In addition, the method may include distributing, by the third router and to the cluster of routers, third routing performance data indicating a performance of the third path when communicating with the first application infrastructure over the third path. Finally, the method may include distributing, by the fourth router and to the cluster of routers, fourth routing performance data indicating a performance of the fourth path when communicating with the second application infrastructure over the fourth path.

Additionally, the techniques described herein may be performed as a method and/or by a system having non-transitory computer-readable media storing computer-executable instructions that, when executed by one or more processors, performs the techniques described above.

Example Embodiments

As discussed above, cloud computing allows on demand network-based access to application infrastructure to remote user without direct active management by the users. For example, Software-as-a-Service (SaaS), Infrastructure-as-a-Service (IaaS), Platform-as-a-service (PaaS) may be accessible to a remote user through cloud computing. Although examples herein are described primarily with reference to SaaS, the techniques described are not limited to application infrastructures such as SaaS. The techniques described herein may be applied to IaaS, PaaS, domain name system (DNS) servers, private data centers, an extranet, or any other appropriate remote application infrastructure. Conventional techniques for probing SaaS clouds entail probing by each interface of each router in a location (e.g., a colocation (colo) facility, a remote enterprise, a regional gateway site, etc.), then each router makes an independent decision on which path to select to a given SaaS cloud. However, for a cluster of routers in a site, given a single ISP, the results of each probe will be essentially the same for a given SaaS cloud. Thus, this creates an unnecessary amount of probing traffic. Additionally, if there is more than one ISP for a site, the amount of probing traffic increases tremendously, as each interface of each router in the cluster of routers probes each path to the SaaS cloud. Multiple paths from a remote user to a given SaaS cloud, result in an incredibly large volume of traffic across a software defined wide area network (SD-WAN) simply due to the amount of probes from each interface of each router to each SaaS cloud over each service provider.

Accordingly, this disclosure describes techniques for probing SaaS clouds efficiently by distributing probing responsibilities in a cluster of routers to multiple routers and sharing the context of the probe results among the other routers in the cluster. In this way, each router can determine the best path to a given SaaS cloud regardless of whether that particular router sent probes to the given SaaS, resulting in optimum performance and the best possible quality of experience (QoE) for a user.

In some examples, a remote site with end users may have a bank or cluster of multiple routers used for connecting to a network fabric, for example, a SD-WAN. The cluster of routers at the remote site may directly access SaaS clouds using one or more ISPs through the SD-WAN. Alternately or in addition, the access path may also go through a regional gateway hub location of routers before reaching the SaaS cloud. Techniques described herein provide for distributing the probing of each separate path to a single router, with a backup router in case of router failure of the originally assigned router. Each router then distributes performance data indicating a performance of the path the router has probed, to the other router in the cluster. In this way, each router has path performance data for each path to each SaaS cloud, without having to individually probe each path. The distribution of probing may be done in a round robin fashion. Alternately or in addition, the distribution may be determined depending on the capacity of each router. Where a router with higher capacity may probe more paths than a router with a lower capacity. Regardless of capacity however, each router will still have access to routing performance data for each path to each SaaS cloud. The distribution of probing may also be defined by a user.

Consider an example where each router in a cluster of routers (e.g., routers in a remote site, regional gateway site, colo facility, etc.) may be assigned to probe one path (e.g., an ISP, MPLS, 4G LTE, etc.) to a particular SaaS cloud. For instance, a first router may probe an email application over a first ISP. A second router may probe the same email application but using a different path, for example using MPLS. Once each router receives the routing performance data determined from their respective probing, they distribute the routing performance data to all routers in the cluster. This allows a third router, to choose the path with the best performance data, and QoE for a user, to the email application, without having to probe either path. Alternately, for redundancy purposes and when preferred by a user, multiple routers, but less than all the routers in the cluster of routers, may be assigned to probe a particular path, still resulting in less data traffic than current techniques where each interface of each router probes each path.

Figure 1:
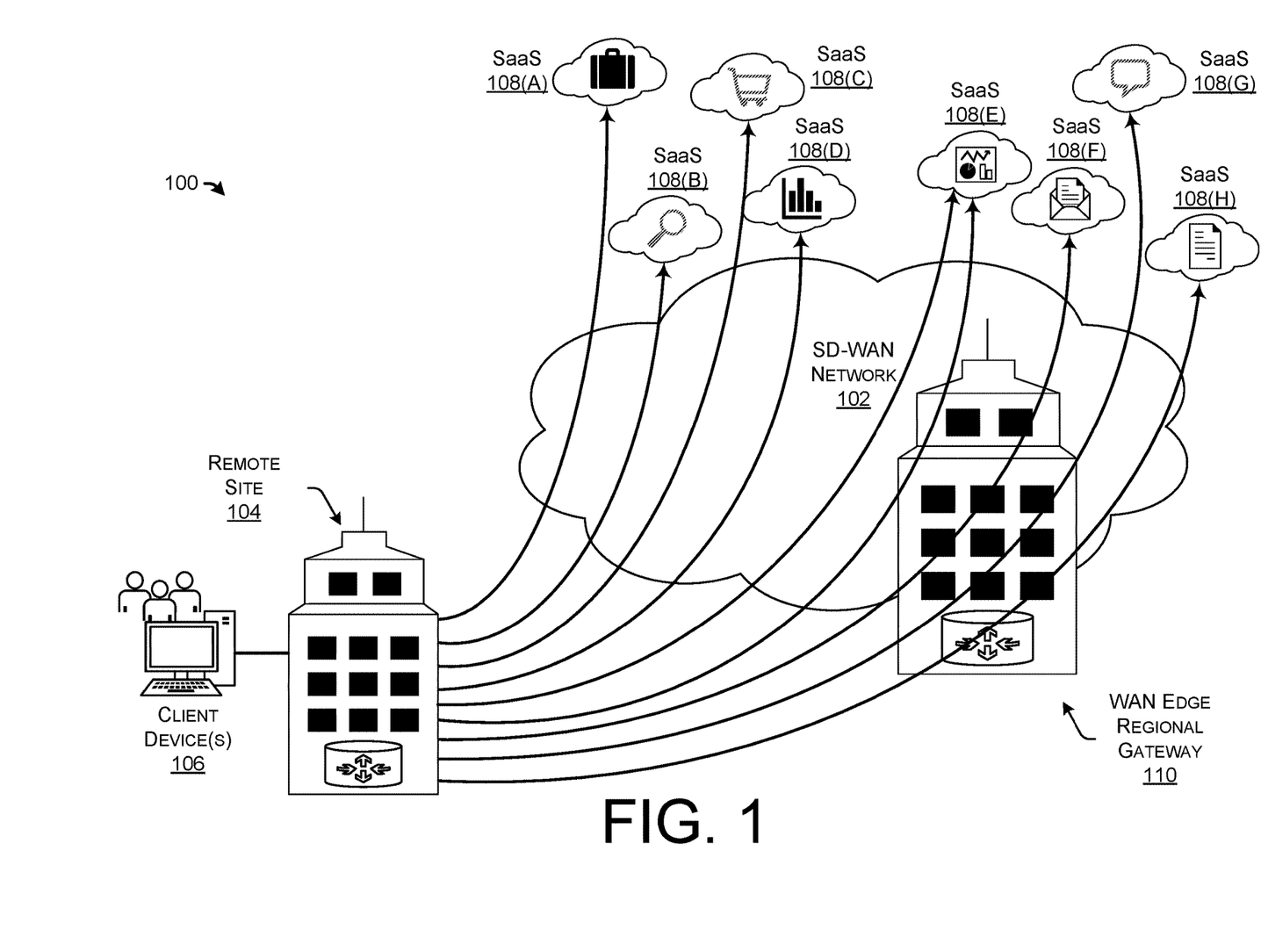
FIG. 1 is system-architecture diagrams illustrating an example architecture and data flow associated with some of the techniques described herein for distributing the probing of software-as-a-service clouds.

FIG. 1 is a system-architecture diagrams illustrating an example environment 100 and the probing data flow associated with various techniques described herein for distributed probing of SaaS clouds over a SD-WAN. The environment 100 includes a SD-WAN network 102. Environment 100 also includes a remote site 104, such as an enterprise organization where one or more client devices 106 reside. Remote site 104 is equipped with a cluster of multiple routers for routing communication to and from the remote site 104. The cluster of routers in remote site 104 may route communication traffic from a client device 106 to a SaaS cloud through the SD-WAN network 102. For instance, the routers in remote site 104 may route communication traffic from a client device 106 through the SD-WAN network 102 to any one of the multiple example SaaS 108 clouds as shown in environment 100. In addition, environment 100 includes a WAN edge regional gateway 110. The WAN edge regional gateway 110 also includes a cluster of multiple routers and can receive communication traffic from remote sites such as remote site 104 and route the communication traffic through the SD-WAN network to and from any of the example SaaS 108 clouds shown.

Probing of the paths to SaaS 108 clouds can be distributed among the cluster of routers in remote site 104. Alternately or in addition, the cluster of routers in the WAN edge regional gateway 110 may also distribute probing responsibilities when probing the example SaaS 108 clouds shown in FIG. 1. For example, in remote site 104 a first router may directly probe the path to SaaS 108(A), a second router may directly probe the path to SaaS 108(B), a third router may directly probe the path to SaaS 108(C), a fourth router may directly probe the path to SaaS 108(D), and a fifth router may directly probe the path to SaaS 108(E). Each router may then distribute routing performance data indicating a performance of the path each respective router probed, to the other routers in the cluster. Thus, each router in the cluster will have routing performance data for each path to each SaaS 108 cloud without having to individually probe each path. Similarly, the cluster of routers in the WAN edge regional gateway 110 may distribute probing responsibilities and share routing performance data among the other routers in the cluster of routers in WAN edge regional gateway 110. For instance, a first router may probe the path to SaaS 108(E), a second router may probe the path to SaaS 108(F), a third router may probe the path to SaaS 108(G), and a fourth router may probe the path to SaaS 108(H). Each router in the cluster of routers may then distribute routing performance data indicating a performance of the path each respective router probed, to the other routers in the cluster.

Alternately or in addition, routers in the cluster of routers included in remote site 104, may use paths through the WAN edge regional gateway 110 to communicate with some of the example SaaS 108 clouds. For instance, a router in remote site 104 may probe a path to SaaS 108(F) through the WAN edged regional gateway 110 as shown in FIG. 1. In this example, a seventh router in remote site 104 probes a path to the WAN edge regional gateway 110. Then one or more routers in WAN edge regional gateway 110 probe one or more path from WAN edge regional gateway 110 to SaaS 108(F). Thus, the routing performance data determined and distributed by the seventh router in remote site 104, will include the entirety of the performance data of the path from remote site 104 to the WAN edge regional gateway, and the best performing path from the WAN edge regional gateway 110 to the SaaS 108(F) cloud.

Each router in the cluster of routers of both the remote site 104 and the WAN edge regional gateway 110 may probe a single path to a SaaS 108 cloud, or multiple paths to the same SaaS 108 cloud, or a different SaaS 108 cloud. For example, a first router may probe an email application over a first ISP, a second router may probe the same email application over a second ISP, and still a third router may probe the same email application over a path using MPLS. Each of the three routers then distribute the respective routing performance data for the path that was probed to all the other routers in the cluster. Thus, if a fourth router is transmitting a communication to the email application, the fourth router will have the routing performance data for each path to the email application, in this example the path using the first ISP, the path using the second ISP, and the path using MPLS. The fourth router will use the path with the best routing performance data even though the fourth router has not probed any of the paths to the email application.

When a router from remote site 104 probes a path to a SaaS 108 cloud that leads through the WAN edge regional gateway 110, for instance the path from remote site 104 to SaaS 108(E) that leads through WAN edge regional gateway 110, the router in remote site 104 responsible for probing that path, will send probes to WAN edge regional gateway 110. The cluster of routers at WAN edge regional gateway 110 will have distributed probing responsibilities as described above. When the path with the best routing performance data is determined from the WAN edge regional gateway 110 to SaaS 108(E), that routing performance data will be included with the routing performance data from the remote site 104 to the WAN edge regional gateway 110 to determine the routing performance for the entire path. Thus, routing performance data for the path from remote site 104 directly to SaaS 108(E) may be compared to routing performance data from the path from remote site 104 to SaaS 108(E) that travels through WAN edge regional gateway 110. When a client device 106 requests an interaction with SaaS 108(E), any router in the cluster of routers of remote site 104 has routing performance data for both paths leading to SaaS 108(E) and is able to communicate using the path with the best routing performance data, even if that particular router has not probed either path.

The infrastructure will distribute application infrastructure probing responsibilities to one or more routing device for a given site with a cluster of routing devices. The distribution of probing among the cluster of routers may be done in a round robin fashion where each router will have an equal number of application infrastructure probing responsibilities that are assigned one per device until all devices have been assigned a path, and then the process repeated. The distribution may be determined based on router capacity, where a router with higher capacity will probe more paths than a router with lower capacity. Alternately or in addition, the distribution may be based on some other user determined criteria. For example, a first router may probe all paths to an email application, a second router may probe all paths to a shopping application, etc. Alternately, a first router may probe paths to multiple application infrastructure, but only over paths using a first ISP, a second router may probe multiple application infrastructure, but only over 4G LTE paths, and so forth. Additionally, any combination of probing distribution may be used as appropriate. The infrastructure ensures that no single device is overwhelmed due to the probe enablement and the probe load is shared to accommodate the capacity based on a given routing device.

Figure 2A:
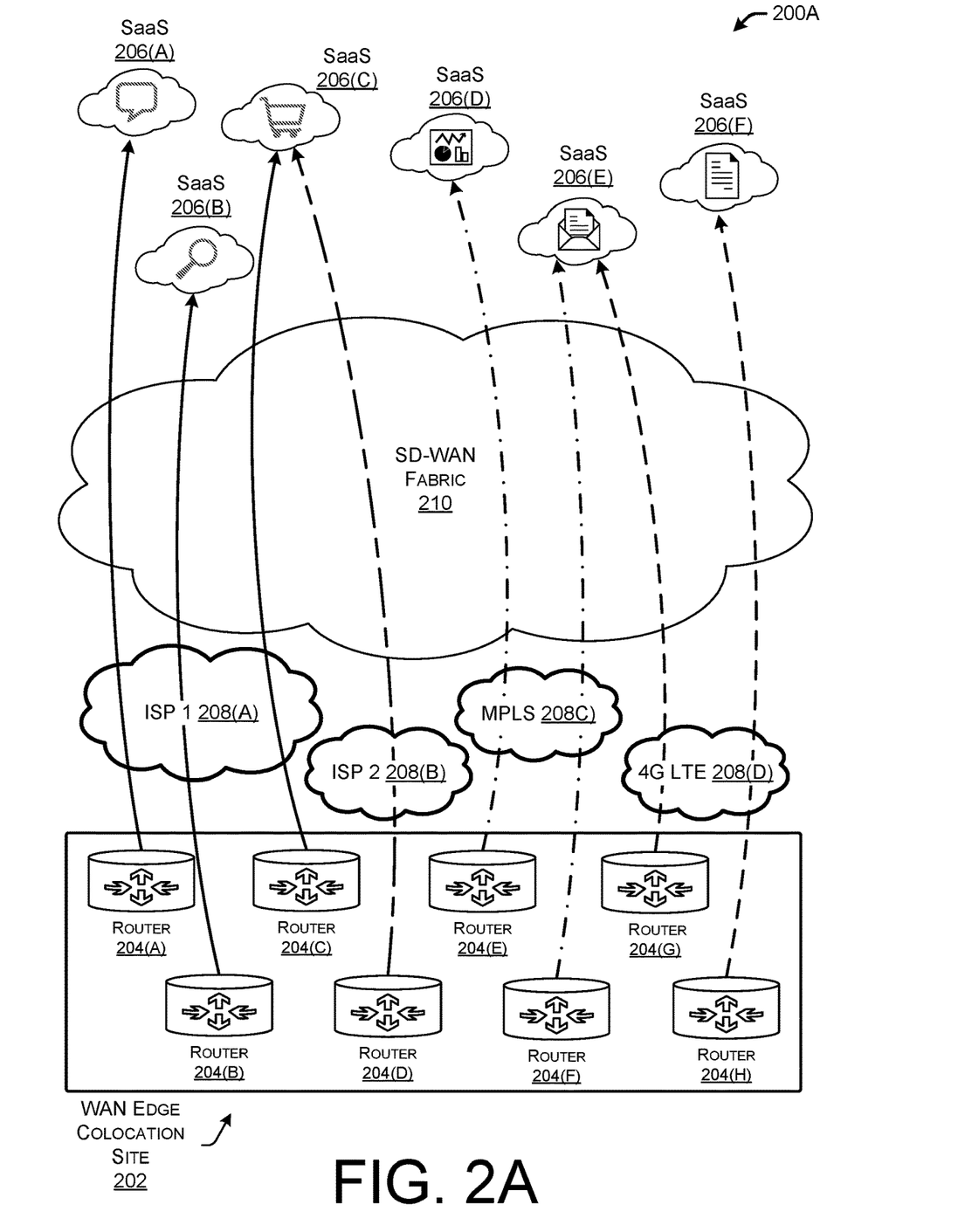
FIG. 2A is an example of distributing the probing of software-as-a-service clouds among multiple routers in a colocation site.

FIG. 2A is an example environment 200A illustrating data flow from a WAN edge to multiple SaaS clouds over a SD-WAN using multiple different service provider paths. Environment 200A include a WAN edge colocation site 202 that has a cluster of routers 204. The routers 204 route communications to multiple SaaS 206 clouds over multiple paths provided by various service providers 208 through a SD-WAN fabric 210. The cluster of routers 204 distribute probing responsibilities among the different routers. Additionally, the routers 204 distribute the resulting routing performance data (e.g., loss, latency, a Quality of Experience (QoE) score, etc.) for each path to the multiple SaaS 206 clouds, to the other routers in the cluster. For example, router 204(A) probes a path using ISP 1 208(A) to SaaS 206(A) and distributes the resulting routing performance data to router 204(B), router 204(C), router 204(D), router 204(E), router 204(F), router 204(G), router 204(H), and router 204(F). Thus, if router 204(F) sends communication data to SaaS 206(A), router 204(F) will have the routing performance data for the ISP 1 208(A) path to SaaS 206(A).

Environment 200A illustrates two separate paths from the WAN edge colocation site 202 to SaaS 206(C), the first path using ISP 1 208(A) and the second path using ISP 2 208(B). Router 204(C) sends probes on the path to SaaS 206(C) using ISP1 208(A) and router 204(D) sends probes on the path to SaaS 206(C) using ISP 2 208(B). Router 204(C) and router 204(D) distribute the respective routing performance data, and when any of the routers 204 need to send communications to SaaS 206(C), the path with the best routing performance data is used. Similarly, router 204(F) send probes to SaaS 206(E) on the path using MPLS 208(C) and router 204(G) sends probes to SaaS 206(E) on the path using 4G LTE 208(D). Router 204(F) and router 204(G) then distribute the routing performance data for the path using MPLS 208(C) and the path using 4G LTE 208(D) respectively, to the other routers 204 in WAN edge colo site 202. Thus, all the routers 204 in WAN edge colocation site 202 have been provided with the routing performance data for both paths, and when any of the routers 204 send communication to SaaS 206(E) the path with the best routing performance data can be used.

Figure 2B:
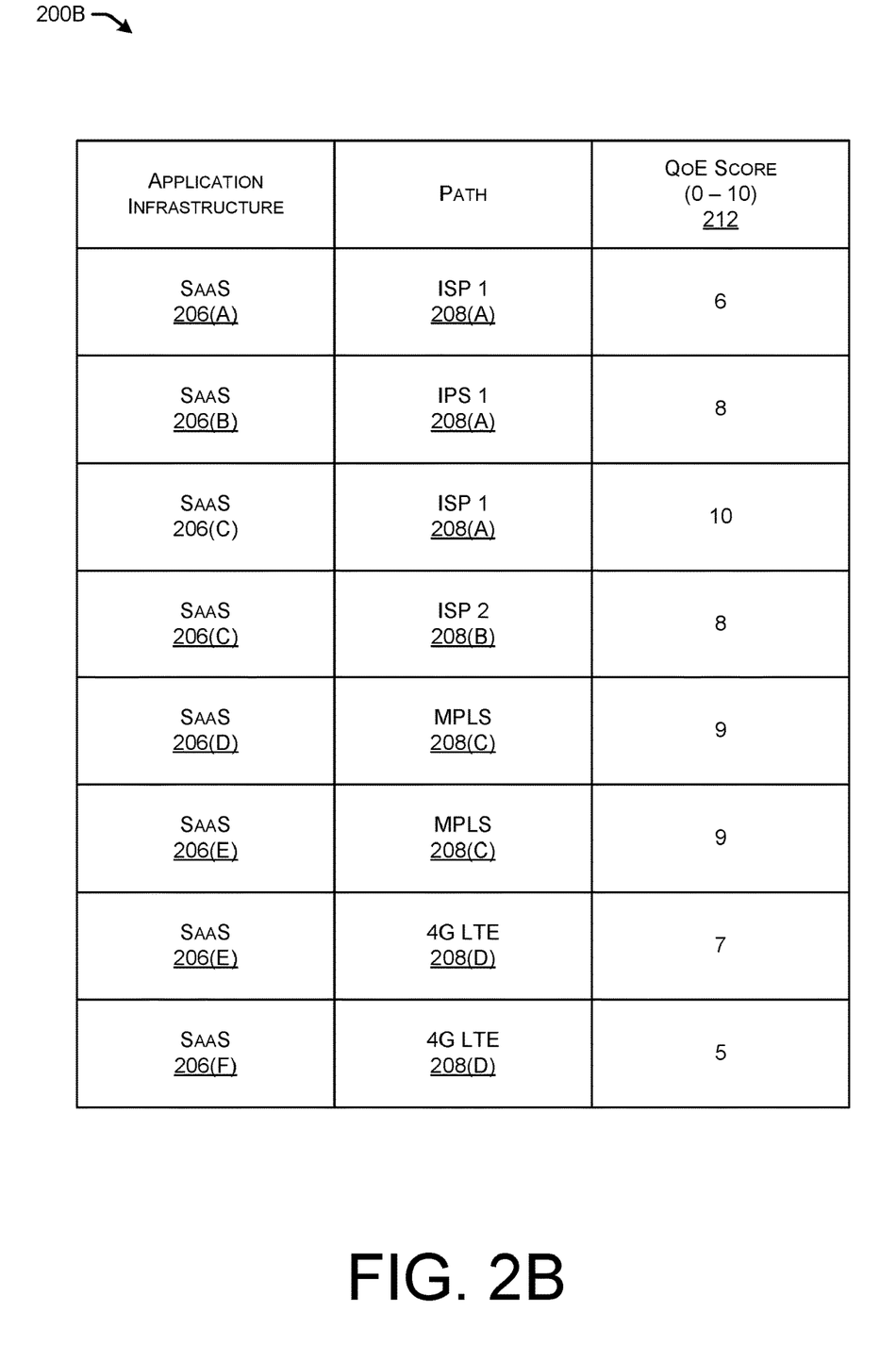
FIG. 2B is an example table illustrating the quality of experience scores determined from probing the software-as-a-service clouds illustrated in FIG. 2A.

FIG. 2B is an example table 200B illustrating an example of routing performance data indicating a performance of each path when communicating with an application infrastructure. In the illustrated example, the QoE scores serves as a routing performance data metric for each path using the network service providers 208 determined from probing the SaaS 206 clouds by the routers 204 in the WAN edge colo site 202 shown in FIG. 2A. For example, router 204(B) probes a path to SaaS 206(B) over IPS 1 208(A) and has a QoE score 212 of 8, router 204(E) probes a path to SaaS 206(D) over MPLS 208(C) and has a QoE score of 9, and router 204(H) probes SaaS 206(F) over path 4G LTE 208(D) and has a QoE score of 5, and so forth. In another example, referring to FIG. 2A where router 204(C) probes SaaS 206(C) over a first path using ISP 1 208(A) and router 204(D) probes SaaS 206(C) over a second path using ISP 2 208(B), table 200B shows the QoE score 212 of the first path to be 10 and the QoE score 212 of the second path to be 8. Thus, the first path has superior routing performance data and when any router 204 in WAN edge colocation site 202 needs to communication with SaaS 206(C), that router will compare the routing performance data of the first path to the routing performance data of the second path and determine that the first path has a preferable QoE score, and the first path will be used for the communication. Similarly, table 200B shows two paths to the application infrastructure, SaaS 206(E), a first path over MPLS 208(C) with a QoE 212 of 9 and a second path over 4G LTE 208(D) with a QoE 212 of 7. Thus, the first path has better routing performance data than the second path and when any of the routers 204 in the cluster of routers in WAN edge colocation site 202 communicate with SaaS 206(E) the first path will be used for the communication.

FIG. 2B illustrates an example of comparing a routing data performance metric, a QoE score 212, for different path to various application infrastructures. The QoE score 212 is but an example of a routing performance metric used for comparison, however other routing performance metrics may be used to compare path performance, such as loss, latency, etc.

Figure 3:
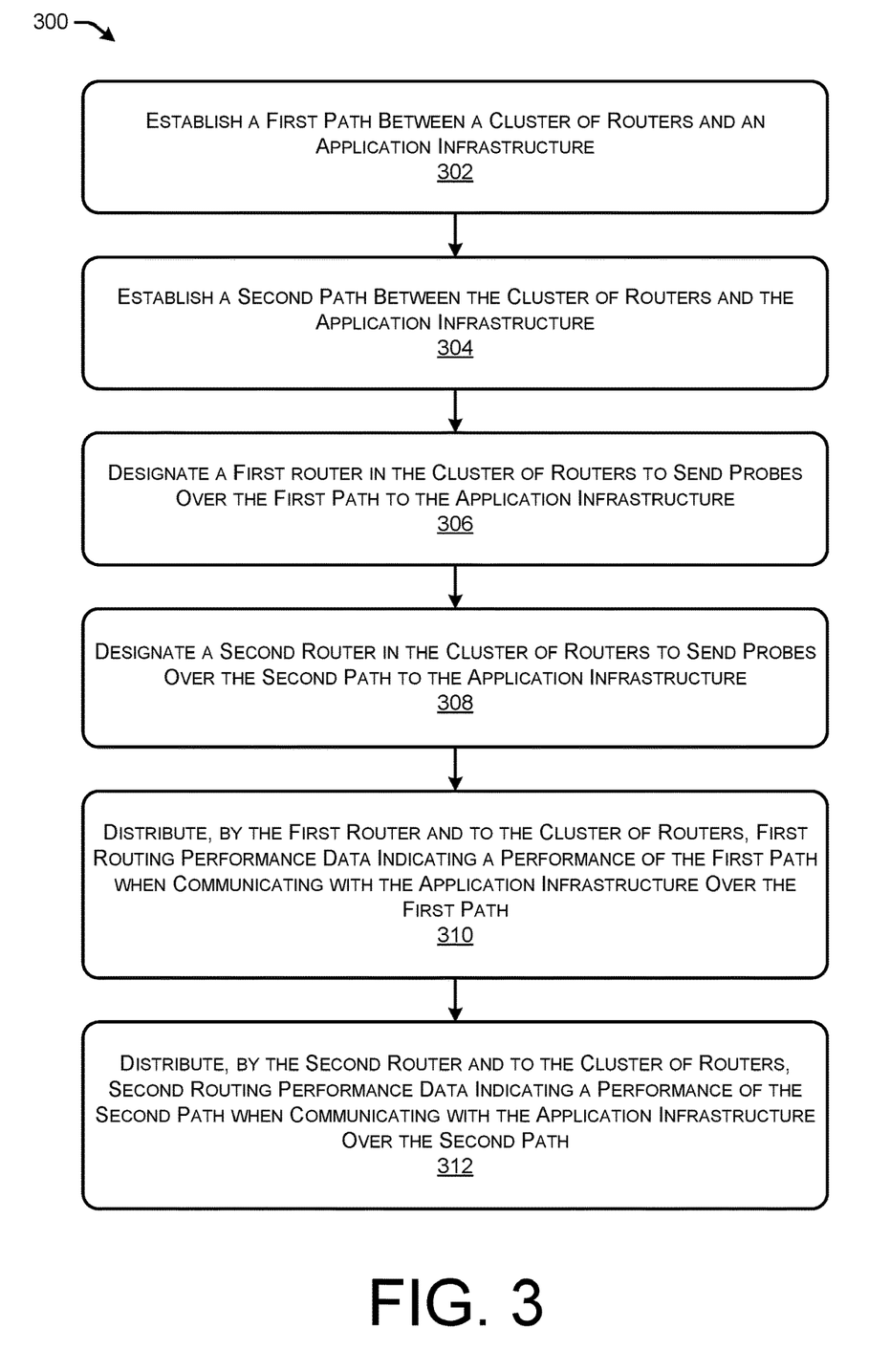
FIG. 3 is a flow diagram illustrating an example method for distributing probing responsibilities over two paths to a same application infrastructure.
Figure 4A:
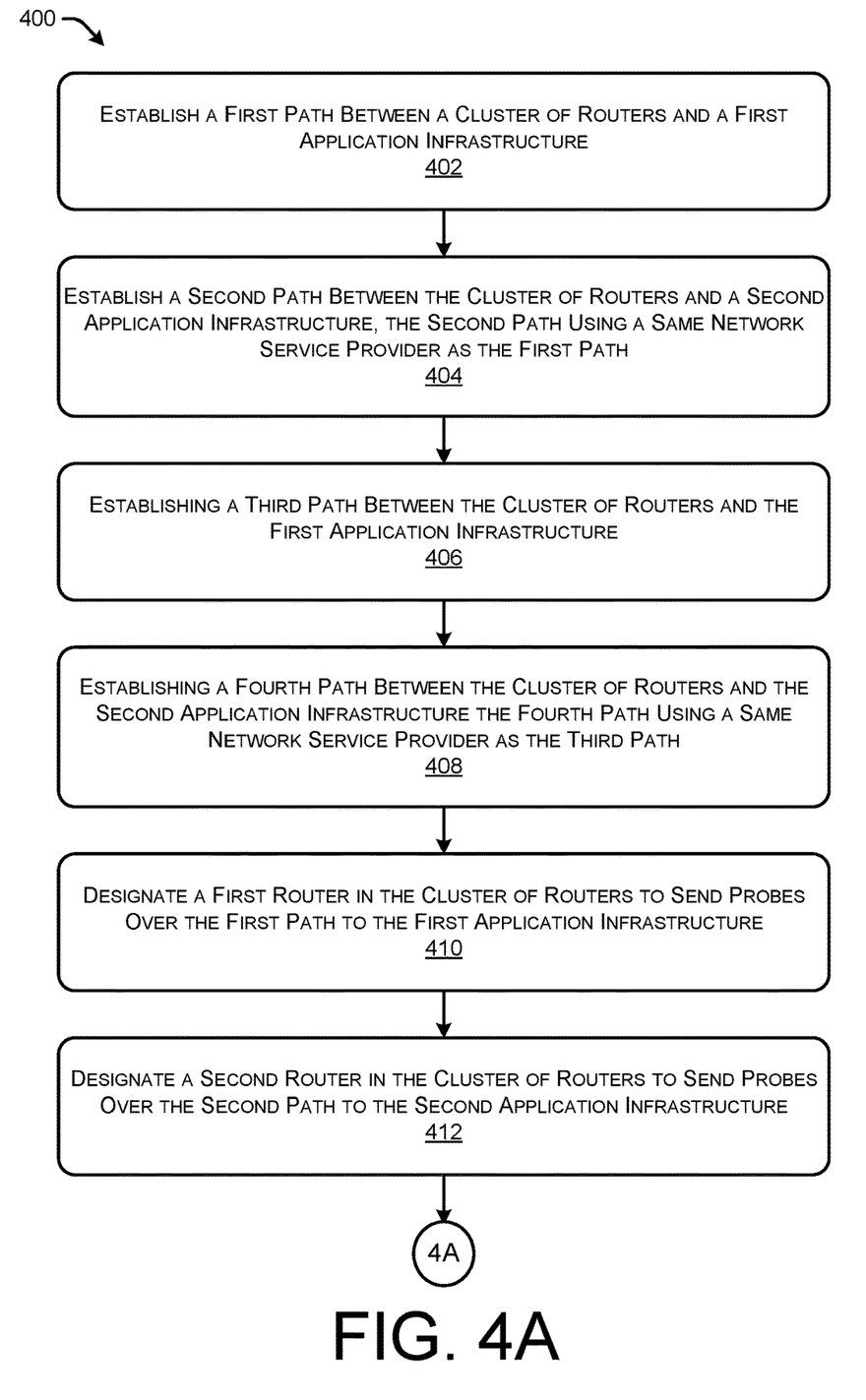
FIG. 4A and FIG. 4B is a flow diagram illustrating an example method for distributing probing responsibilities to multiple application infrastructure using multiple paths.
Figure 4B:
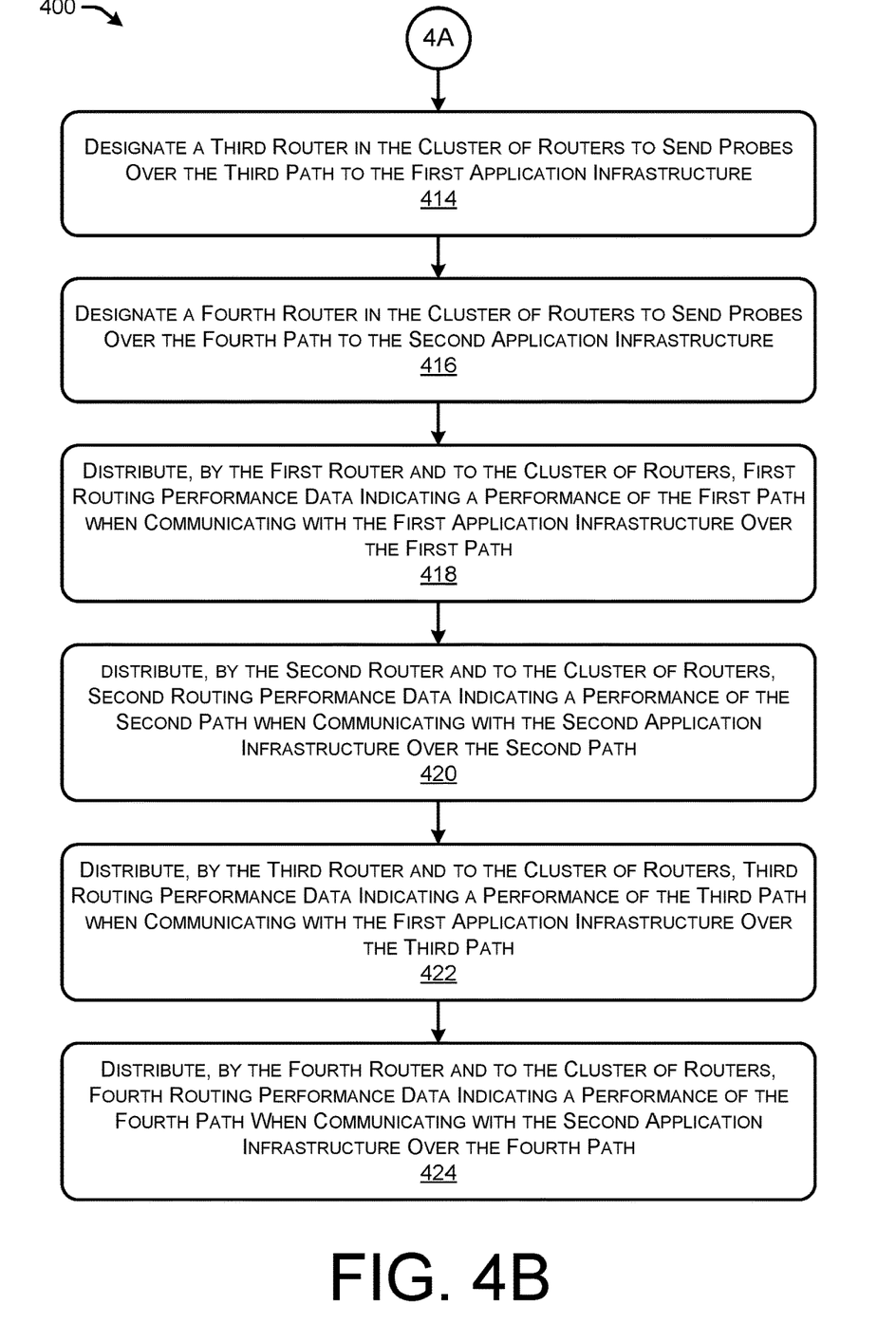

FIGS. 3, 4A, and 4B are flow diagrams illustrating example methods 300 and 400 for performing various aspects of the techniques described in this disclosure. The logical operations described herein with respect to FIGS. 3, 4A, and 4B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3, 4A, and 4B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302, a first path between a cluster of routers and an application infrastructure is established. For example, with reference to FIG. 2A, a first path from the WAN edge colocation site 202 with a cluster of routers 204 is established to SaaS 206(C) using ISP 1 208(A) through the SD-WAN fabric 210. In a second example, with reference to FIG. 1, a first path from the remote site 104 to SaaS 108(E) is established that leads directly from the remote site 104 through the SD-WAN network 102.

At operation 304, a second path between the cluster of routers and the application infrastructure is established. Referring again to FIG. 2A, a second path from the WAN edge colocation site 202 with the cluster of routers 204 is established to SaaS 206(C) using ISP 2 208(B) through the SD-WAN fabric 210. In the second example, with reference to FIG. 1, a second path from the remote site 104 to SaaS 108(E) is established that leads through the WAN edge regional gateway 110 before continuing on to SaaS 108(E).

At operation 306, a first router in the cluster of routers is designated to send probes over the first path to the application infrastructure. In FIG. 2A, router 204(C) has been designated to send probes over the first path using ISP 1 208(A) to the application infrastructure SaaS 206(C) cloud. In some examples, a second router 204 may be designated as a backup for probing SaaS 206(C) over ISP 1 208(A), for instance router 204(B), in the event of a failure of router 204(C).

At operation 308, a second router in the cluster of routers is designated to send probes over the second path to the application infrastructure. In FIG. 2A, router 204(D) has been designated to send probes over the second path using ISP 2 208(B) to the application infrastructure SaaS 206(C) cloud.

At operation 310, the first router distributes first routing performance data indicating a performance of the first path when communicating with the application infrastructure over the first path, to the cluster of routers. Once router 204(C) has sent probes over the first path ISP 1 208(A) to the SaaS 206(C) cloud, router 204(C) then distributes the first routing performance data to the cluster of routers 204. For Example, in FIG. 2B, the routing performance data is illustrated as a QoE score of 10 for the first path.

At operation 312, the second router distributes second routing performance data indicating a performance of the second path when communicating with the application infrastructure over the second path, to the cluster of routers. For example, once router 204(D) has sent probes over the second path ISP 2 208(B) to the SaaS 206(C) cloud, router 204(D) distributes the second routing performance data to the cluster of routers 204. For Example, in FIG. 2B, the routing performance data is illustrated as a QoE score of 8 for the second path to SaaS 206(C). Once the cluster of routers 204 have received the routing performance data of both the first path and the second path, any router in the cluster of routers 204 that communicates with the application infrastructure SaaS 206(C) cloud will be able to compare the routing performance data of the first path and second path and determine which path to use for communicating, in this example each router would use the first path ISP 1 208(A) because the routing performance data, QoE score 212, of the first path is higher than the routing performance data of the second path, a QoE score 212 of 8.

FIGS. 4A and 4B illustrate a flow diagram of an example method 400 for distributing routing performance data for multiple paths to multiple application infrastructures among multiple routers as described above with reference to in FIG. 1, FIG. 2A, and FIG. 2B. The operations described herein with respect to the method 400 may be performed by various components and systems, such as the components illustrated and discussed here.

At operation 402, a first path between a cluster of routers and a first application infrastructure is established. For instance, a cluster of routers in a WAN edge regional gateway, or colo facility may use a first ISP to connect to a first application infrastructure such as an email SaaS cloud.

At operation 404, a second path between the cluster of routers and a second application infrastructure is established, where the second path uses a same network service provider as the first path in operation 402. For example, the cluster of routers in the WAN edge regional gateway may use the first ISP to connect to a second application infrastructure such as a shopping SaaS cloud.

At operation 406, a third path between the cluster of routers and the first application infrastructure is established. For example, the cluster of routers in the WAN edge regional gateway may use MPLS to connect to the email SaaS cloud.

At operation 408, a fourth path between the cluster of routers and the second application infrastructure is established, where the fourth path uses a same network service provider as the third path. For instance, the cluster of routers in the WAN edge regional gateway may use MPLS to also connect to the shopping SaaS cloud.

At operation 410, a first router in the cluster of routers is designated to send probes over the first path to the first applications infrastructure. Continuing with the above example, the first router in the cluster of routers is designated to send probes over the first ISP to the email SaaS cloud.

At operation 412, a second router in the cluster of routers is designated to send probes over the second path to the second application infrastructure. In the continued example, the second router is designated to send probes over the over the first ISP to the shopping SaaS cloud.

At operation 414, a third router in the cluster of routers is designated to send probes over the third path to the first application infrastructure. Continuing with the above example, the third router is designated to send probes over MPLS to the email SaaS cloud.

At operation 416, a fourth router in the cluster of routers is designated to send probes over the fourth path to the second application infrastructure. For example, continuing as above, the fourth router in the cluster of routers in the WAN edge regional gateway is designated to send probes over MPLS to the shopping SaaS cloud.

At operation 418, the first router distributes first routing performance data indicating a performance of the first path when communicating with the first application infrastructure over the first path, to the cluster of routers. For example, the first router distributes routing performance data, such as a QoE score as illustrated in FIG. 2B, for the first path using the first ISP between the first router and the email SaaS cloud, to all the other routers in the cluster of routers at the WAN edge regional gateway.

At operation 420, the second router distributes second routing performance data indicating a performance of the second path when communicating with the second application infrastructure over the second path, to the cluster of routers. For example, the second router distributes routing performance data, such as a QoE score as illustrated in FIG. 2B, for the second path using the first ISP between the second router and the shopping SaaS cloud, to all the other routers in the cluster of routers at the WAN edge regional gateway. The routing performance data can be used by other routers in the cluster of routers to determine the best path for communicating with each of multiple application infrastructures such as the email SaaS or shopping SaaS in the example above.

At operation 422, the third router distributes third routing performance data indicating a performance of the third path when communicating with the first application infrastructure over the third path, to the cluster of routers. For example, the third router distributes routing performance data, such as a QoE score as illustrated in FIG. 2B, for the third path using MPLS between the third router and the email SaaS cloud, to all the other routers in the cluster of routers at the WAN edge regional gateway.

At operation 424, the fourth router distributes fourth routing performance data indicating a performance of the fourth path when communicating with the second application infrastructure over the fourth path, to the cluster of routers. For example, the fourth router distributes routing performance data, such as a QoE score illustrated in FIG. 2B, for the fourth path using MPLS between the fourth router and the shopping SaaS cloud, to all the other routers in the cluster at the WAN edge regional gateway.

Figure 5:
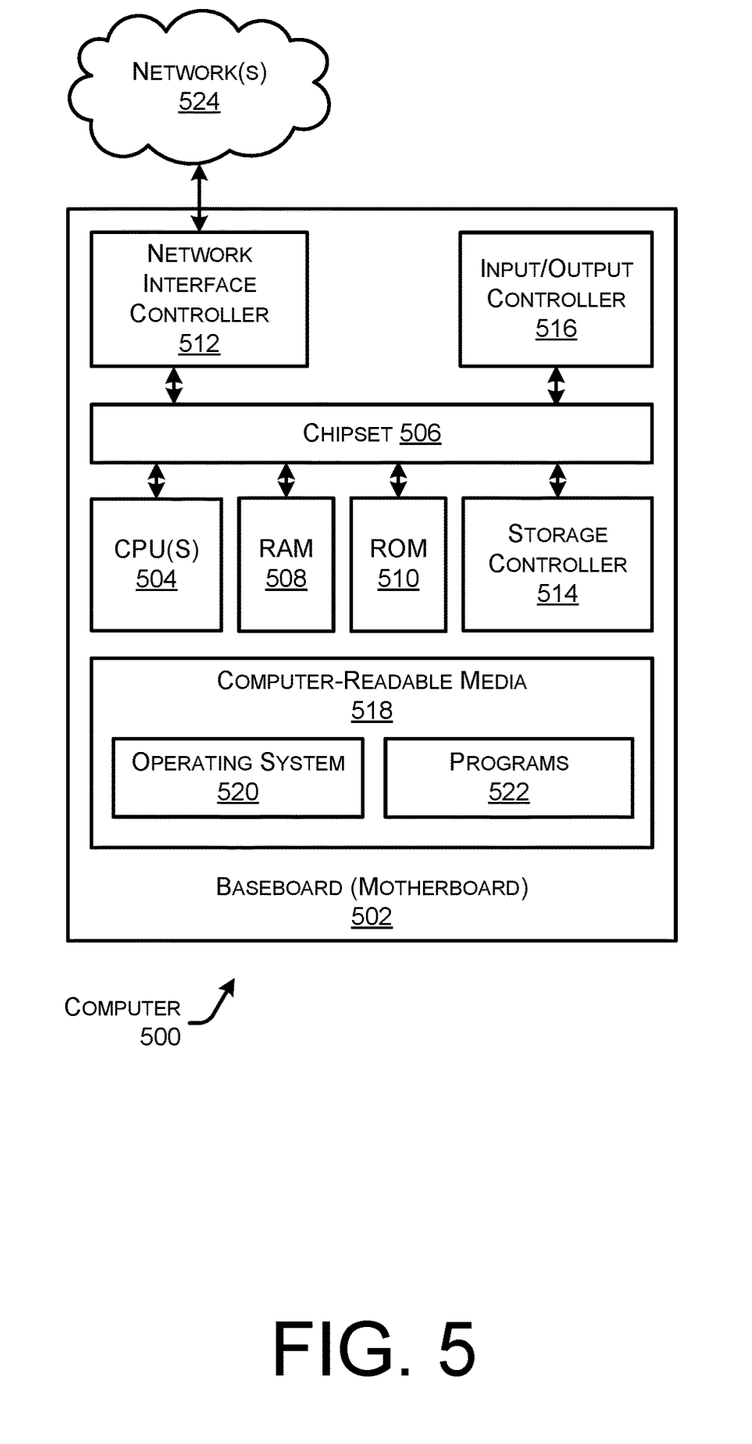
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, controller, computing resource, switch, router, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500.

The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the SD-WAN network 102. The chipset 506 can include functionality for providing network connectivity through a NIC 512, such as a gigabit Ethernet adapter. The NIC 512 is capable of connecting the computer 500 to other computing devices over the network 524 and/or SD-WAN network 102. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network 102 and or any components included therein, may be supported by one or more devices similar to computer 500. Stated otherwise, some or all of the operations performed by the network 102, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4B. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for distributing probing responsibilities to a cluster of routers and distributing routing performance data. The programs 522 may enable the routers 204 to perform various applications.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   establishing a first direct path between a cluster of routers located at a remote location of an enterprise organization and an application infrastructure;
   establishing a second direct path between the cluster of routers and the application infrastructure;
   designating a first router in the cluster of routers to send probes over the first direct path to the application infrastructure;
   designating a second router in the cluster of routers to send probes over the second direct path to the application infrastructure, wherein the second router and the first router are separate routers;
   distributing, by the first router and to the cluster of routers, first routing performance data indicating a performance of the first direct path when communicating with the application infrastructure over the first direct path; and
   distributing, by the second router and to the cluster of routers, second routing performance data indicating a performance of the second direct path when communicating with the application infrastructure over the second direct path.

2. The method of claim 1, further comprising:
   comparing, by a third router in the cluster of routers, the first routing performance data received from the first router and the second routing performance data received from the second router, wherein the third router is a separate router from the first router and the second router;
   determining, by the third router and based at least in part on the comparing, whether to communicate with the application infrastructure using the first direct path or the second direct path;
   in response to determining that the first routing performance data is preferable to the second routing performance data, communicating, by the third router, with the application infrastructure using the first direct path; and
   in response to determining that the second routing performance data is preferable to the first routing performance data, communicating, by the third router, with the application infrastructure using the second direct path.

3. The method of claim 1, wherein the cluster of routers is in an edge site colocation facility and the first direct path and the second direct path are between the edge site colocation facility and the application infrastructure.

4. The method of claim 3, further comprising:
   establishing a third path between the cluster of routers and a regional gateway site;
   designating a third router to send probes over the third path to the regional gateway site, wherein the third router is a separate router from the first router and the second router;
   receiving, by the third router and from the regional gateway site, a third routing performance data indicating a performance of a fourth path between the regional gateway site and the application infrastructure;
   determining, by the third router, a fourth routing performance data indicating a performance of a fifth path from the third router to the application infrastructure that flows through the regional gateway site; and
   distributing, by the third router and to the cluster of routers, fourth routing performance data indicating a performance of the fifth path when communicating with the application infrastructure over the fifth path.

5. The method of claim 1, wherein the application infrastructure is one of:
   a software as a service (SaaS);
   an infrastructure as a service (IaaS);
   a platform as a service (PaaS);
   a domain name system (DNS) server;
   a private data center; or
   an extranet.

6. The method of claim 1, further comprising:
   in response to a failure of the first router, designating a third router in the cluster of routers to send probes over the first direct path from the cluster of routers to the application infrastructure;
   in response to a failure of the second router, designating a fourth router in the cluster of routers to send probes over the second direct path from the cluster of routers to the application infrastructure, wherein the fourth router and the third router are separate routers;
   distributing, by the third router and to the cluster of routers, first routing performance data indicating a performance of the first direct path when communicating with the application infrastructure over the first direct path; and
   distributing, by the fourth router and to the cluster of routers, second routing performance data indicating a performance of the second direct path when communicating with the application infrastructure over the second direct path.

7. The method of claim 1 wherein the first direct path is a different network service provider than the second direct path.

8. The method of claim 1, wherein designating routers in the cluster of routers to probe paths to application infrastructures is determined in a round robin fashion.

9. A system comprising:
   one or more processors; and one or more non-transitory computer-readable media storing computer-executable instructions that, when executed by the one or more processors, cause the one or more processors to perform operations comprising:
establishing a first direct path between a cluster of routers located at a remote location of an enterprise organization and an application infrastructure;
establishing a second direct path between the cluster of routers and the application infrastructure;
designating a first router in the cluster of routers to send probes over the first direct path to the application infrastructure;
designating a second router in the cluster of routers to send probes over the second direct path to the application infrastructure wherein the second router and the first router are separate routers;
distributing, by the first router and to the cluster of routers, first routing performance data indicating a performance of the first direct path when communicating with the application infrastructure over the first direct path; and
distributing, by the second router and to the cluster of routers, second routing performance data indicating a performance of the second direct path when communicating with the application infrastructure over the second direct path.

10. The system of claim 9, further comprising:
comparing, by a third router in the cluster of routers, the first routing performance data received from the first router and the second routing performance data received from the second router, wherein the third router is a separate router from the first router and the second router;
determining, by the third router and based at least in part on the comparing, whether to communicate with the application infrastructure using the first direct path or the second direct path;
in response to determining that the first routing performance data is preferable to the second routing performance data, communicating, by the third router, with the application infrastructure using the first direct path; and
in response to determining that the second routing performance data is preferable to the first routing performance data, communicating, by the third router, with the application infrastructure using the second direct path.

11. The system of claim 9, wherein the cluster of routers is in an edge site colocation facility and the first direct path and the second direct path are between the edge site colocation facility and the application infrastructure.

12. The system of claim 11, further comprising:
establishing a third path between the cluster of routers and a regional gateway site;
designating a third router to send probes over the third path to the regional gateway site, wherein the third router is a separate router from the first router and the second router;
receiving, by the third router and from the regional gateway site, a third routing performance data indicating a performance of a fourth path between the regional gateway site and the application infrastructure;
determining, by the third router, a fourth routing performance data indicating a performance of a fifth path from the third router to the application infrastructure that flows through the regional gateway site; and
distributing, by the third router and to the cluster of routers, fourth routing performance data indicating a performance of the fifth path when communicating with the application infrastructure over the fifth path.

13. The system of claim 9, wherein the application infrastructure is one of:
a software as a service (SaaS);
an infrastructure as a service (IaaS);
a platform as a service (PaaS);
a domain name system (DNS) server;
a private data center; or
an extranet.

14. The system of claim 9, further comprising:
in response to a failure of the first router, designating a third router in the cluster of routers to send probes over the first direct path from the cluster of routers to the application infrastructure;
in response to a failure of the second router, designating a fourth router in the cluster of routers to send probes over the second direct path from the cluster of routers to the application infrastructure, wherein the fourth router and the third router are separate routers;
distributing, by the third router and to the cluster of routers, first routing performance data indicating a performance of the first direct path when communicating with the application infrastructure over the first direct path; and
distributing, by the fourth router and to the cluster of routers, second routing performance data indicating a performance of the second direct path when communicating with the application infrastructure over the second direct path.

15. The system of claim 9, wherein the first direct path is a different networks service provider than the second direct path.

16. The system of claim 9, wherein designating routers in the cluster of routers to probe paths to application infrastructures is determined based at least in part on router capacity.

17. A method comprising:
establishing a first direct path between a cluster of routers located at a remote location of an enterprise organization and a first application infrastructure;
establishing a second direct path between the cluster of routers and a second application infrastructure, the second direct path using a same network service provider as the first direct path;
establishing a third direct path between the cluster of routers and the first application infrastructure;
establishing a fourth direct path between the cluster of routers and the second application infrastructure, the fourth direct path using a same network service provider as the third direct path;
designating a first router in the cluster of routers to send probes over the first direct path to the first application infrastructure;
designating a second router in the cluster of routers to send probes over the second direct path to the second application infrastructure;
designating a third router in the cluster of routers to send probes over the third direct path to the first application infrastructure;
designating a fourth router in the cluster of routers to send probes over the fourth direct path to the second application infrastructure, wherein the first router, the second router, the third router, and the fourth router are separate routers;

distributing, by the first router and to the cluster of routers, first routing performance data indicating a performance of the first direct path when communicating with the first application infrastructure over the first direct path;

distributing, by the second router and to the cluster of routers, second routing performance data indicating a performance of the second direct path when communicating with the second application infrastructure over the second direct path;

distributing, by the third router and to the cluster of routers, third routing performance data indicating a performance of the third direct path when communicating with the first application infrastructure over the third direct path; and distributing, by the fourth router and to the cluster of routers, fourth routing performance data indicating a performance of the fourth direct path when communicating with the second application infrastructure over the fourth direct path.

18. The method of claim 17, further comprising;

comparing, by a fifth router in the cluster of routers, the first routing performance data received from the first router and the third routing performance data received from the third router, wherein the fifth router is a separate router from the first router, second router, third router, and fourth router;

determining, by the fifth router and based at least in part on the comparing, whether to communicate with the first application infrastructure using the first direct path or the third direct path;

in response to determining that the first routing performance data is preferable to the third routing performance data, communicating, by the fifth router, with the first application infrastructure using the first direct path; and in response to determining that the third routing performance data is preferable to the first routing performance data, communicating, by the fifth router with the first application infrastructure using the third direct path.

19. The method of claim 18, further comprising:

comparing, by the fifth router in the cluster of routers, the second routing performance data received from the second router and the fourth routing performance data received from the fourth router;

determining, by the fifth router and based at least in part on the comparing, whether to communicate with the second application infrastructure using the second direct path or the fourth direct path;

in response to determining that the second routing performance data is preferable to the fourth routing performance data, communicating, by the fifth router, with the second application infrastructure using the second direct path; and in response to determining that the fourth routing performance data is preferable to the second routing performance data, communicating, by the fifth router, with the second application infrastructure using the fourth direct path.

20. The method of claim 17, wherein designating routers in the cluster of routers to probe paths to application infrastructures is determined based at least in part on router capacity.

* * * * *